United States Patent [19]

Schmidt et al.

[11] Patent Number: 5,352,038
[45] Date of Patent: Oct. 4, 1994

[54] METHOD OF AND MEASURING ARRANGEMENT FOR CONTACTLESS ON-LINE MEASUREMENT

[75] Inventors: Hugo Schmidt, Giessen-Luetzellinden; Manfred Ruckszio, Taunusstein; Raimund Haas, Frankfurt am Main; Walter Mackert, Wiesbaden, all of Fed. Rep. of Germany

[73] Assignee: Hoechst Aktiengesellschaft, Frankfurt am Main, Fed. Rep. of Germany

[21] Appl. No.: 185,168

[22] Filed: Jan. 24, 1994

Related U.S. Application Data

[63] Continuation of Ser. No. 876,418, Apr. 30, 1992, abandoned.

[30] Foreign Application Priority Data

May 6, 1991 [DE] Fed. Rep. of Germany ....... 4114671

[51] Int. Cl.$^5$ .................... G01N 25/00; G01N 21/55; G01B 11/30
[52] U.S. Cl. .................... 374/45; 374/161; 374/4; 356/371; 356/448; 250/571
[58] Field of Search .............. 374/4, 5, 6, 7, 161, 374/45; 356/371, 445, 448; 250/571

[56] References Cited

U.S. PATENT DOCUMENTS

| | | | |
|---|---|---|---|
| 3,206,603 | 9/1965 | Mauro | 374/5 |
| 3,433,052 | 3/1969 | Maley | 374/5 |

(List continued on next page.)

FOREIGN PATENT DOCUMENTS

| | | | |
|---|---|---|---|
| 0034309 | 2/1983 | Japan | 356/371 |
| 0019908 | 2/1984 | Japan | 374/161 |
| 0006428 | 1/1988 | Japan | 374/161 |
| 0142305 | 1/1991 | Japan | 356/371 |
| 0857821 | 8/1981 | U.S.S.R. | 374/6 |
| 1004755 | 3/1983 | U.S.S.R. | 356/371 |
| 1395939 | 5/1988 | U.S.S.R. | 374/7 |
| 1567882 | 5/1990 | U.S.S.R. | 356/371 |
| 2167855 | 6/1986 | United Kingdom . | |
| 2220065 | 12/1989 | United Kingdom . | |

OTHER PUBLICATIONS

Patent Abstracts of Japan, vol. 12, No. 51 (P-667) Feb. 16, 1988 (an abstract of JP-A-62 198 707 (Nippon Kokan KK <NKK>) Sep. 2, 1987) (only abstract considered).

C. Linhart and A. Weckenmann, "Contactless Evaluation of the Thickness of Surface Coatings with Thermal Effects," Technisches Messen TM. Bd. 49, Nr. 11, Nov. 1982, Munchen DE, pp. 391–398.

Sick GmbH Optik-Elektronik, "SORM Sick Optical Roughness Measuring System" (no date).

"Profile Measuring Station RM 600 2-D" (1990).

*Primary Examiner*—Diego F. F. Gutierrez
*Attorney, Agent, or Firm*—Foley & Lardner

[57] ABSTRACT

With an infrared radiator, the surface temperature of which is kept constant during measurement, a measuring area on a roughened material surface is thermally irradiated with oblique incidence of the rays. The temperature of the reflected thermal radiation is measured by an infrared thermometer, which is arranged above the measuring area in such a way that the reflected radiation falls into the area of coverage of the infrared thermometer. The entire measuring area of the material surface which lies in the field of coverage of the infrared thermometer must be thermally irradiated. The measured temperature variation of the reflected radiation in dependence on the known surface roughness of the material is stored in a comparison device. This comparison device is fed a set value for the desired surface roughness. The infrared temperature of a material surface, initially unknown with respect to its surface roughness, is measured and compared with the stored temperature variation, in order to determine the magnitude of the surface roughness. From the value thus obtained and the set value fed in, a differential signal is formed, which is fed via the output of the comparison device to a control of a treatment device for the material.

11 Claims, 3 Drawing Sheets

U.S. PATENT DOCUMENTS

| | | | |
|---|---|---|---|
| 3,667,846 | 6/1972 | Nater et al. | 374/6 |
| 3,771,880 | 11/1973 | Bennett | 356/448 |
| 3,922,093 | 11/1975 | Dandliker et al. | 356/371 |
| 3,973,122 | 8/1976 | Goldberg | 374/7 |
| 3,978,713 | 9/1976 | Penney | 374/7 |
| 4,012,141 | 3/1977 | Hanneman | 356/448 |
| 4,017,188 | 4/1977 | Sawatary | 356/371 |
| 4,136,566 | 1/1979 | Christensen | 374/161 |
| 4,278,353 | 7/1981 | Ostermayer, Jr. | 356/448 |
| 4,290,698 | 9/1981 | Milana | 356/371 |
| 4,511,800 | 4/1985 | Harbeke et al. | 356/371 |
| 4,521,118 | 6/1985 | Rosencwaig | 374/5 |
| 4,522,510 | 6/1985 | Rosencwaig et al. | 374/7 |
| 4,579,463 | 4/1986 | Rosencwaig et al. | 374/5 |
| 4,634,290 | 1/1987 | Rosencwaig et al. | 374/5 |
| 4,634,294 | 1/1987 | Christol et al. | 374/130 |
| 4,679,946 | 7/1987 | Rosencwaig et al. | 374/7 |
| 4,803,374 | 2/1989 | Monfort et al. | 356/371 |
| 4,973,164 | 11/1990 | Weber et al. | 356/371 |
| 4,986,672 | 1/1991 | Beynon | 374/130 |
| 5,103,106 | 4/1992 | Golberstein | 250/571 |
| 5,118,945 | 6/1992 | Winschuh et al. | 374/7 |

METHOD OF AND MEASURING ARRANGEMENT FOR CONTACTLESS ON-LINE MEASUREMENT

This application is a continuation of application Ser. No. 07/876,418, filed Apr. 30, 1992 now abandoned.

BACKGROUND OF THE INVENTION

The invention relates to a method of providing a contactless on-line measurement of the surface roughness of a material in plate or strip form made of metal or a metal alloy, as well as to a measuring arrangement.

Texture parameters are an essential quality feature of metal surfaces. The most well known is the representation of the surface roughness, the extensive data on a measured roughness profile section in practice usually being reduced to just a few characteristic variables, such as, for example, the peak-to-valley height Ra, and the average peak-to-valley height, Rz.

In roughness measurement, it is generally not necessary to scan and measure the entire surface uninterruptedly. It is sufficient to obtain a large number of measurements so that an adequate statistical finding is achieved. In the case of a fast-moving material, considerable difficulties are involved in detecting the roughness by means of an on-line measurement. The traditional stylus method is not in any way capable of producing satisfactory results at speeds greater than 20 m/min. Therefore, such on-line measurements have long been carried out on an optical basis.

For instance, a roughness measuring instrument which is used in the field of the metal-processing industry as an on-line measuring instrument for continuous process control is described in the company publication of Sick GmbH Optik-Elektronik, Munich, "SORM Sick optisches Rauheitsmeßsystem" (SORM Sick optical roughness measuring system). With the aid of a semiconductor laser, the measuring instrument generates a fine laser measuring beam on the material surface. The light spot diameter is about 10 μm. The surface structure causes the impinging light to be reflected in a certain spatial direction, depending on the flank angle of the surface facet. The principal direction of the reflection is detected by a laser diode receiver array and converted into an angle-dependent analog signal. This analog signal is digitized and the surface level profile calculated on the basis of the flank angle data and the advancement information. Consequently, a profile characteristic which is approximately comparable with a mechanical measurement is obtained as raw data. Subsequently, this raw data is evaluated in the usual way and the standardized roughness variables, such as Ra and Rz, are determined and output.

In the case of this measurement, the intensity distribution reflected from the surface falls, in the form of a scattering lobe via a number of lenses, onto the assigned photoreceiver array arranged annularly around the laser light spot. The photoreceivers forming this photoreceiver array are interconnected in the form of a PSD (position sensitive detector) sensor. The direction of the point of concentration of the scattering lobe is measured directly at each measuring point. Consequently, the flank steepness of the respective surface facet is determined optically at each surface measuring point. Upon movement of the surface to be measured under the measuring head, the surface profile is calculated by back-integration. The roughness measuring area is for Ra 0.05 to 2.5 μm, and the material speed lies in the range of 0.3 to 30 m/sec.

This measuring instrument is very complex since the optical measuring head contains, in addition to a semiconductor laser, the receiver array, an autofocussing device for correcting the optical measuring head, and a signal preprocessing means. Furthermore, an evaluation computer with two floppy disk drives, an interface for a plurality of optical measuring heads, and a central processing unit are required.

A surface measuring system RM 600, with which surface structures between 0.02 μm and 600 μm can be detected quickly and contactlessly is described in the company publication "Profilmeßplatz RM 600 2-D" (Profile measuring station RM 600 2-D) of Rodenstock, Munich. The measuring system essentially comprises three components, namely an optical distance sensor, a linear or X/Y advancing unit, and a control computer with a color screen or monitor, printer, and software package. The key component of the system is an optical sensor which registers changes in distance by means of a laser focus of 1 or 2 μm in diameter. During measurement, the measured object is moved uniformly past the sensor. The measured values thereby occurring form a level profile which can be output by the control computer as a graphic which can be measured. By suitable filtering, findings on individual surface parameters, such as roughness, waviness etc. are possible.

The optical distance sensor operates with an infrared laser, the beam of which is focussed on the surface of the measured object. Depending on the type of sensor, a light spot of 1 or 2 μm in diameter is produced on the measured surface and imaged in the sensor onto a focus detector. If the distance from the measured surface changes, the detector supplies a control signal for the automatic focus correcting means. A plunger coil system then displaces the objective until the laser beam is again focussed exactly on the surface of the measured object.

Since the focus distance is constant, the movements of the objective correspond exactly to the level variation of the measured surface. The respective position of the objective is detected by an inductive sensor and supplies a measuring signal which is independent of the reflection characteristics of the measured surface.

This surface measuring system is not suitable for the measurement of fast-running materials.

The surface roughness of metals or metal alloys is a quality feature which can be used for controlling the roughening of such materials. The surface roughness determines, inter alia, the reflectivity or the diffuse reflectance value of the surface for incident radiation in the ultraviolet or infrared range. For example, the magnitude of the roughness of a strip or a plate made of aluminum or an aluminum alloy is the determining parameter for the reflection of incident infrared radiation on the material surface. As the roughness of such materials on the surface increases, the surface loses reflectivity, and the reflected infrared or thermal radiation decreases.

SUMMARY OF THE INVENTION

One object of the present invention is to develop a method which, on the basis of the reflection behavior of the radiation directed onto the material surface, permits a determination of the surface roughness in a simple way.

In accordance with a first aspect of the invention, the method comprises measuring the temperature of infrared radiation reflected from a measuring point located on the surface of the material, and comparing the temperature measured in the measuring step with a calibrating curve. The calibrating curve represents the temperature of infrared radiation reflected from material surfaces having different known degrees of roughness. The infrared radiation is generated by an infrared radiator having a constant temperature.

In accordance with another aspect of the invention, further steps include maintaining the temperature of the material at the measuring point constant over a predetermined measuring area, exposing the measuring area of the surface of the material to obliquely incident infrared radiation, and measuring the temperature of radiation reflected from the measuring area of the surface of the material.

Another object of the invention is to provide a measuring arrangement for performing a contactless on-line measurement of the surface roughness of a material. The measuring arrangement comprises an infrared radiator which directs infrared rays onto an outlined measuring area of a surface of the material in a path which is directed obliquely onto the surface of the material, and an infrared thermometer which receives infrared rays reflected from the surface of the material.

Further in accordance with this aspect of the invention, a comparison device is provided in which temperature variations of the radiation reflected from the surface of the material are determined by comparing temperature values detected by the infrared thermometer to a set value which is fed into the comparison device. The temperature variations depend on the surface roughness of the material. The comparison device generates differential signals from the temperature variations to obtain control signals. The comparison device has an output which transmits the control signals and which is connected to a control device for altering the surface roughness of the material.

In accordance with yet another aspect of the invention, a measuring arrangement for performing a contactless on-line measurement of the surface roughness of a material includes means for directing infrared rays onto a surface of the material within an outlined measuring area in a path which is directed obliquely onto the surface, means for receiving infrared rays reflected from the surface of the material, and means, responsive to output values of means for receiving, for determining the surface roughness of the material.

Other objects, features and advantages of the present invention will become apparent to those skilled in the art from the following detailed description. It should be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The above and further objects of the invention will become more readily apparent as the invention is more clearly understood from the detailed description to follow, reference being made to the accompanying drawings in which like reference numerals represent like parts throughout, and in which.

DETAILED DESCRIPTION OF THE PREFERRED EMBODIMENTS

Figure 1:
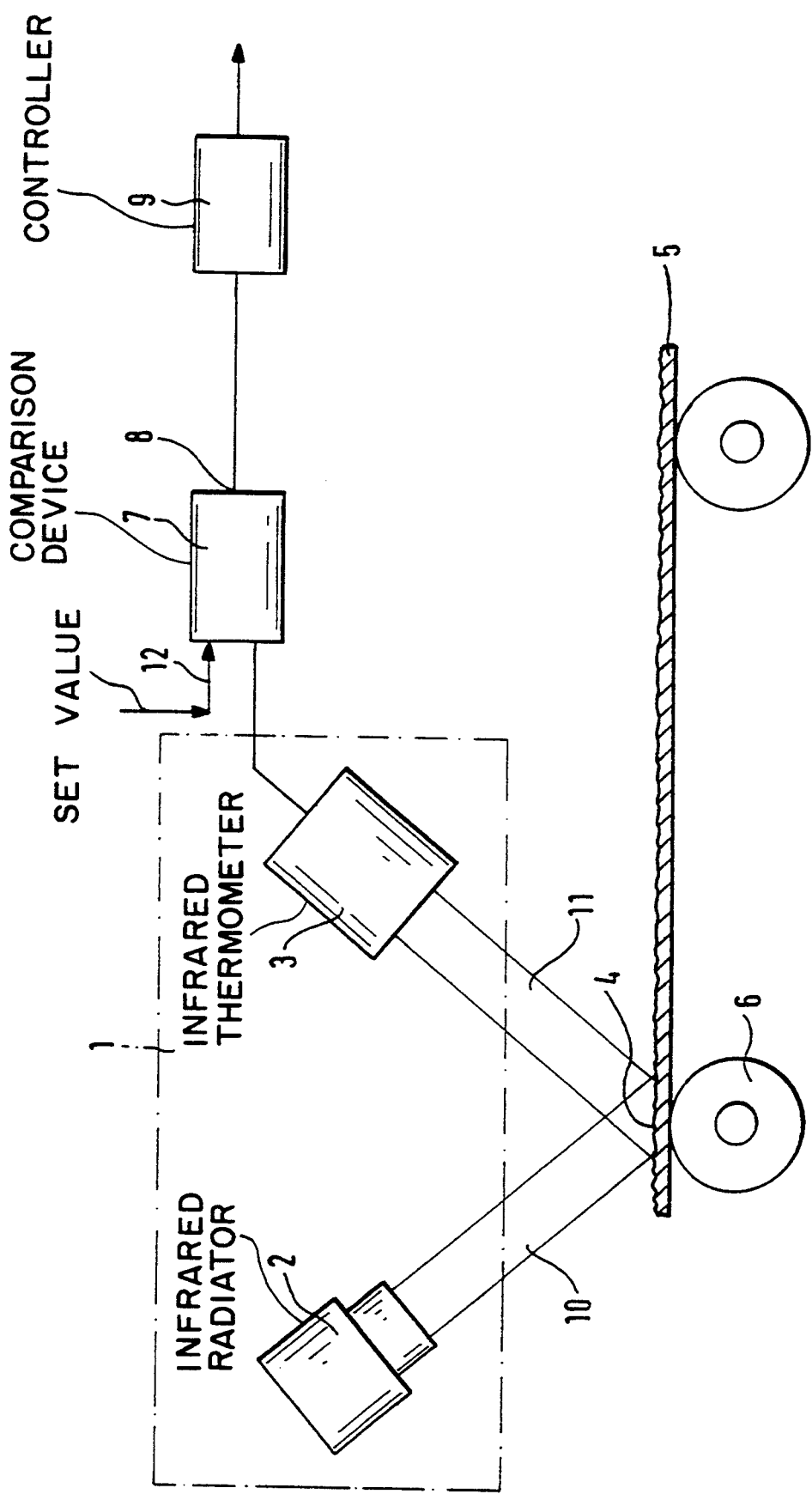
FIG. 1 diagrammatically shows a measuring arrangement according to the invention.

The principal object of the invention is achieved by measuring the temperature of the infrared radiation reflected from the material surface and comparing the measured temperature with a calibrating curve which is recorded in such a way that, with constant temperature of an infrared radiator, the temperature of the infrared radiation reflected from the material surface is measured for different known degrees of roughness. In this case, the degrees of roughness may be detected by known optical and mechanical methods.

Much better information on surface conditions is provided if the reference values for roughness are derived from the spectral breakdown of the reflected infrared radiation.

The material surface, the roughness of which can be measured, is exposed to a spectrum of obliquely incident infrared radiation, including a predetermined wavelength range. By applying rays which include a predetermined wavelength range, as the measuring radiation onto the surface, in the reflection spectrum of the infrared rays, those waves of which the wavelengths are below the dimensions of the surface structure, are greatly reduced. Infrared rays having longer wavelengths, on the other hand, continue to be reflected from the surface. The spectral breakdown thus provides the information on which wavelengths the surface still acts like a mirror. The wavelengths of the reflected rays then correspond to the roughness value of the surface and correspond to a predetermined wavelength range of the reflected infrared rays.

The reflected infrared rays are measured by an infrared thermometer which integrates an intensity of the reflected infrared radiation over predetermined wavelengths within the predetermined wavelength range of the measuring radiation. The infrared thermometer, for example, works in a wavelength range of 8 to 14 $\mu m$ and integrates the wavelengths in this working wavelength range and measures the overall temperature of these rays. This overall temperature is assigned to the roughness value of the measured surface. For all surface roughnesses of interest, the desired calibration curve is obtained, which then provides roughness values which are much more true to reality than those obtained by mechanical scanning.

In a refinement of the method, the material at the measuring point is kept at a constant temperature over the predetermined measuring area, the measuring area is exposed to obliquely incident infrared radiation, and the temperature of the radiation reflected from the measuring area on the material surface is measured. The infrared radiator is expediently kept at a constant temperature, so that the temperature in the measuring area on the material surface is between 373 to 393 K.

In a further development of the method, from the comparison of the measured temperature of the reflected radiation with a set value of the temperature, using the calibrating curve, a signal is obtained for controlling a roughening stage for the material surface.

The measuring arrangement for contactless on-line measurement of the surface roughness of a material in plate or strip form made of metal or a metal alloy is distinguished by the fact that it comprises an infrared radiator and an infrared thermometer and that the path of rays of the infrared radiator is directed obliquely onto the material surface within an outlined measuring area. The measuring arrangement is expediently fitted above a steel roll, over which the material is passed, and the steel roll itself is heated. The measuring arrangement further comprises a comparison device in which the temperature variation of the radiation which is reflected from the material surface in dependence on the surface roughness is stored. A set value of the temperature is fed into the comparison device and compared with the respective measured temperature values in order to obtain a control signal from the differential signal, and an output of the comparison device is connected to a roughening device for the material.

A measuring arrangement 1 for the contactless on-line measurement of the surface roughness of a material 5 in plate or strip form comprises an infrared radiator 2 and an infrared thermometer 3. The path of rays 10 of the infrared radiator 2 is directed obliquely onto the material surface within an outlined measuring area 4. This measuring area 4 is located above a steel roll 6, over which the material 5 is passed. The surface of the infrared radiator is kept at a temperature equal to or greater than 473 K. The temperature in the measuring area on the material surface itself is equal to or greater than 373 K, with a temperature of between 373 K and 393 K being preferred.

The infrared radiation supplies only infrared waves with wavelengths corresponding to a temperature equal to or greater than 473 K, in other words, the rays are selected within a predetermined wavelength range, from wavelengths corresponding to 473 K to wavelengths up to the end of the infrared spectrum. The measuring area on the material surface acts like a reflector or mirror and is kept at a constant temperature. The intensity of the infrared radiation reflected from the measuring area is integrated by the infrared thermometer.

The infrared thermometer 3 is electrically connected to a comparison device 7, in which the temperature variation of the radiation reflected from the material surface in dependence on the known surface roughness, is stored. An output 8 of this comparison device 7 is connected to a controller 9 of a roughening device for the material 5. This roughening device, which is not shown, may be, for example, a mechanical roughening apparatus in which an aluminum strip is roughened mechanically by means of brushing rollers. By regulating the rotational speed of the brushes by means of the output signal of the comparison device 7, the mechanical roughening of the aluminum surface of the strip can be kept constant to a great extent.

The measured temperature values fed into the comparison device 7 are compared with a set value of the temperature, in the event of coincidence no output signal is obtained via the output 8. Only in the event of deviations between the set value and the instantaneous measured temperature value is an output signal obtained from the comparison device 7, which signal is then used for controlling the roughening device for the material.

If different roughenings occur on the material surface, for example an aluminum or other metal surface, whether due to different speeds or due to differences in the material, the material surface has a changed diffuse reflectance. This change is detected by the infrared thermometer as a temperature change and is used for controlling the roughening device. The prerequisite for this measuring method is that for a particular material which has different surface roughnesses, the temperature variation in dependence on the surface roughnesses is empirically determined in advance as the calibrating curve. This temperature variation is synonymous with the reflectance or diffuse reflectance of the material surface in the case of different roughness characteristics of the surface.

The surface temperature of the infrared radiator 2 is kept constant during the measurement. The obliquely incident infrared radiation or thermal radiation on the surface to be measured in the measuring area 4 is reflected within a path of rays 11, care having to be taken that the entire measuring area 4 of the surface which lies in the field of coverage of the infrared thermometer 3 is also thermally irradiated.

The measuring method is based on the idea that the reflected thermal radiation of the infrared radiator 2 depends on the surface roughness of the material surface on which the radiation impinges. Thus, for example, it is found that a less roughened metal surface reflects the thermal radiation more than a more roughened metal surface.

Figure 2:
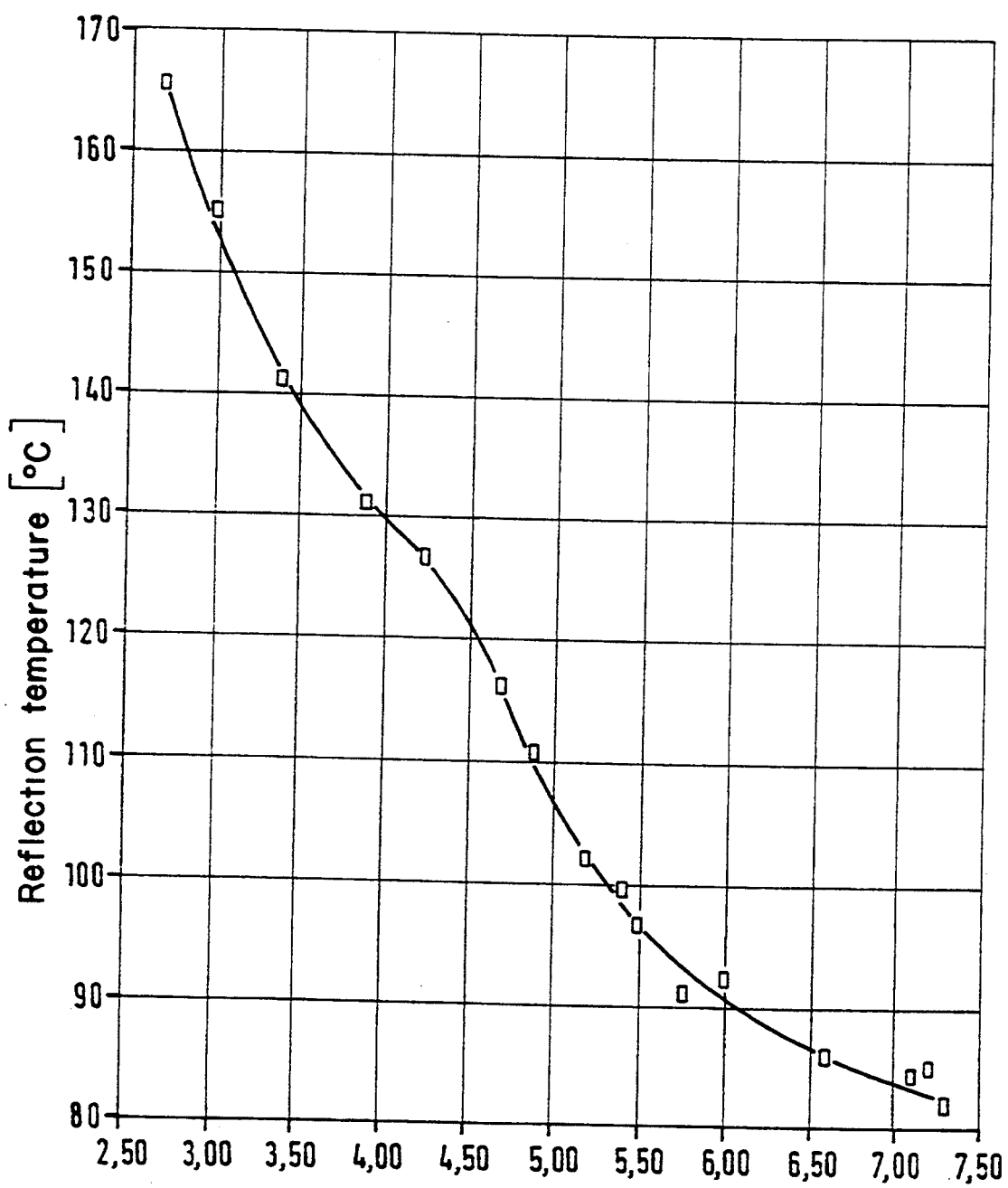
FIG. 2 shows in a diagram the relationship between the measured temperature of the IR radiation reflected from the mechanically roughened surface of an aluminum plate and the average peak-to-valley height, Rz.
Figure 3:
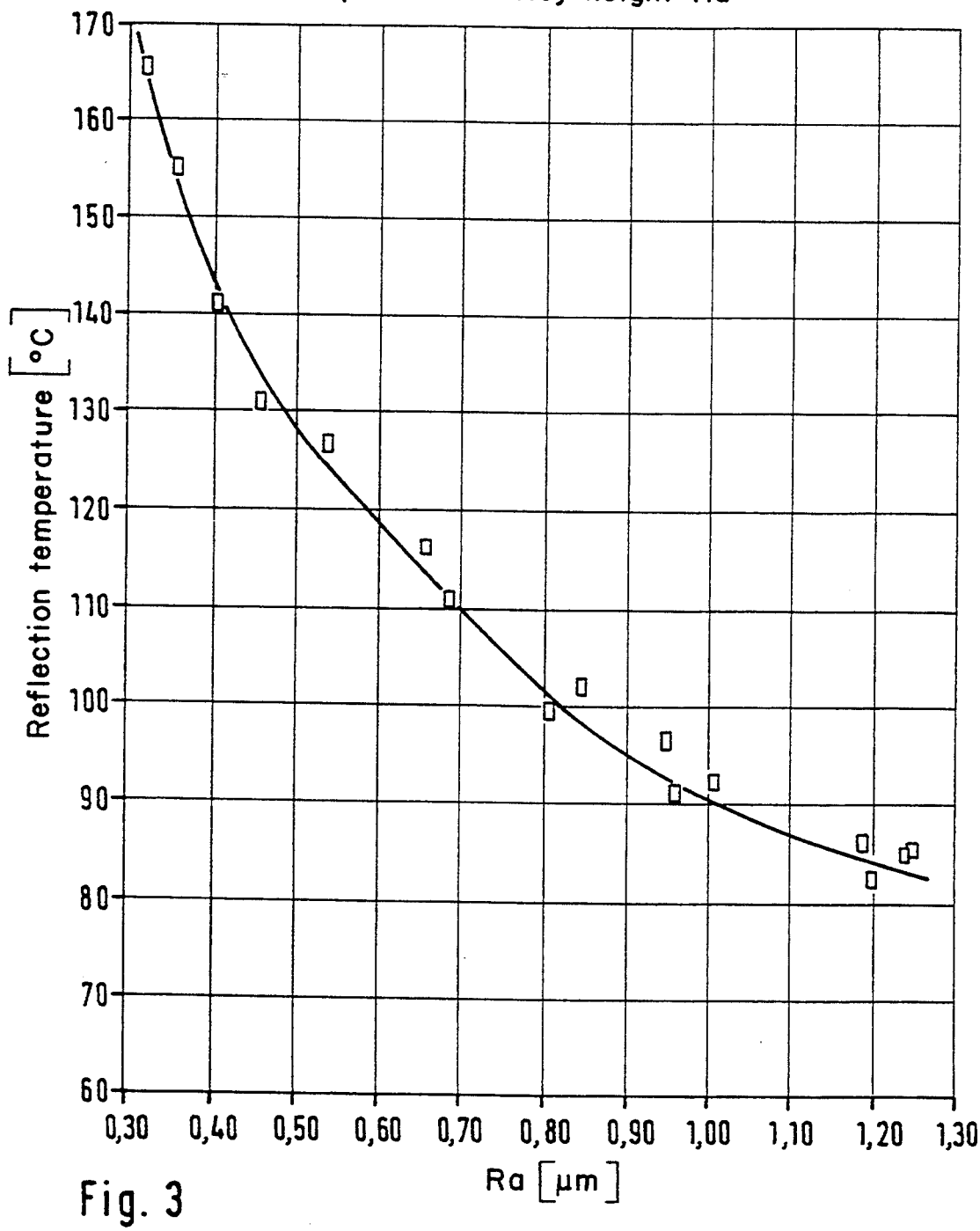
FIG. 3 shows in a diagram similar to FIG. 2 the temperature variation of the IR radiation reflected from a mechanically roughened plate made of aluminum, in dependence on the peak-to-valley height, Ra.

FIGS. 2 and 3 show in diagrams the dependence of the measured temperature of the reflected infrared radiation, referred to for short as reflection temperature in °C., on the average peak-to-valley height, Rz, in $\mu$m of an aluminum plate and on the peak-to-valley height, Ra, in $\mu$m of such a plate. The roughness characteristics Rz and Ra are standardized variables for specifying the roughness of a surface. The average peak-to-valley height, Rz, is the average difference in height between the five highest peaks, pi, and the five lowest valleys, vi, of a height profile of the surface to be measured within a sensing length L=5 mm. It is determined according to the equation (1):

$$Rz = \frac{1}{5} \left( \sum_{i=1}^{5} y_{pi} - \sum_{i=1}^{5} y_{vi} \right) \tag{1}$$

in $\mu$m. The peak-to-valley height, Ra, is the arithmetic mean of the vertical deviations of the roughness profile in relation to the center line of the scanning over a sensing length, L=5 mm. It is obtained according to the equation (2):

$$Ra = \frac{1}{L} \int_0^L |y(x)| dx = \frac{1}{5} \int_0^L |y(x)| dx \tag{2}$$

in $\mu$m.

In the case of the diagram according to FIG. 2, the temperature of the infrared radiator 2 of the measuring arrangement is kept constant at 200° C. (473 K), and the aluminum plate runs through a mechanical roughening device. As can be seen from the diagram, the temperature of the reflected radiation drops with increasing average peak-to-valley height. This temperature variation is stored in the comparison device 7 for aluminum plates of a particular composition as a characteristic variable or calibrating curve. If the infrared temperature or the temperature of the reflected infrared radiation of a roughened surface of an aluminum plate of unknown roughness is measured, the roughness of the plate surface can be determined by a comparison with the stored temperature variation. If the value of the roughness deviates from a desired set value, the output signal of the comparison device 7, which represents a measure of the deviation upward or downward, is used for controlling the roughening device, i.e., in the present case the brushing rollers. Then, according to requirements, either the rotational speed of the brushing rollers is increased or decreased or the running speed of the aluminum plates through the roughening device is altered.

The diagram in FIG. 3 is a variation of the diagram in FIG. 2, and relates to the dependence of the temperature of the infrared radiation reflected from a mechanically roughened aluminum plate on the peak-to-valley height, Ra, in μm. In this case, the plate runs over a bright steel roll. The infrared radiator supplies a constant temperature of, for example, 373 K to 393 K in the measuring area on the material surface. The measured temperature of the reflected radiation drops with increasing peak-to-valley height, Ra. This temperature variation or this calibrating curve is recorded by exposing plates, roughened to different extents, to obliquely incident infrared radiation under otherwise identical measuring conditions and the temperature of the reflected infrared radiation is recorded by means of the infrared thermometer 3. This empirically measured calibrating curve then again forms a characteristic curve which makes it possible to determine the initially unknown roughness, Ra, of an aluminum plate to be measured on the basis of a measured temperature of the reflected radiation. If it is found here that the roughness, Ra, deviates from a set value which is fed via an input 12 into the comparison device 7, a differential signal is produced at the output 8 of the comparison device 7 as a control signal for the roughening device. Depending on the operating sign of this control signal, the plate is then roughened to a greater or lesser extent.

The relationships specified above apply equally to aluminum strips which are used as base materials for light-sensitive layers in the production of printing plates. Furthermore, the measuring method can also be applied to roughened metal plates and strips made of steel, zinc, and metal alloys, which are used, for example, in the production of printing plates.

The invention provides the advantage that the relationship between the reflectivity of a roughened metal surface for thermal radiation and the surface roughness can be used in a simple way with little expenditure on apparatus. Both the infrared radiator used and the infrared thermometer are commercially available devices and are thus not described in greater detail.

What is claimed is:

1. A method of performing a contactless on-line measurement of the surface roughness of a material formed of a metal or metal alloy, said method comprising the steps of:

(A) exposing said material to a spectrum of obliquely incident infrared radiation, including a predetermined wavelength range, generated by an infrared radiator;

(B) measuring the temperature of infrared radiation reflected from a measuring area located on the surface of said material by integrating an intensity of said reflected infrared radiation over predetermined wavelengths within said predetermined wavelength range, the intensity of said infrared radiation depending on the surface roughness of said material; and (C) determining the surface roughness of said material by comparing the temperature measured in said step (B) with a calibrating curve, said calibrating curve representing the temperature of infrared radiation reflected from material surfaces having different, known degrees of roughness, said infrared radiation being generated and applied as in step (A).

2. The method as claimed in claim 1, further comprising the step of:

(D) maintaining the temperature of said material at said measuring area constant 3. The method as claimed in claim 2, further comprising the step of obtaining a signal for controlling the roughening of said surface of said material by comparing the measured temperature of the reflected radiation with a set value obtained from said calibrating curve.

4. The method as claimed in claim 1, further comprising maintaining the temperature of said material at said measuring area constant at a temperature of between 373 and 393 K.

5. The method as claimed in claim 1, further comprising maintaining the temperature of said infrared radiator constant during said measuring step.

6. The method as claimed in claim 1, wherein said method comprises measuring the surface roughness of aluminum as said material, the surface of which is mechanically roughened.

7. The method as claimed in claim 1, wherein said measuring area is an outlined measuring area and further comprising exposing said outlined measuring area of the surface of said material to said infrared radiation, wherein the exposed outlined measuring area is lying in a field of coverage of a measuring device for measuring radiation reflected from said surface of said material.

8. A measuring arrangement for performing a contactless on-line measurement of the surface roughness of a material, said measuring arrangement comprising:

(A) an infrared radiator which directs a spectrum of infrared rays, including a predetermined wavelength range, onto an outlined measuring area of a surface of said material in a path which is directed obliquely onto said surface of said material;

(B) an infrared thermometer which receives infrared rays reflected from said surface of said material, and which measures temperature values of said reflected infrared rays by integrating the intensity of said reflected infrared rays over predetermined wavelengths within said predetermined wavelength range; and (C) a comparison device in which temperature variations of the radiation reflected from said surface of said material are determined by comparing temperature values measured by said infrared thermometer to a set value which is fed into said comparison device, said temperature variations depending on the surface roughness of said material, said comparison device generating differential signals from said temperature variations to obtain control signals and having an output which transmits said control signals to a control device and which is connected to said control device for altering the surface roughness of said material.

9. The measuring arrangement as claimed in claim 8, further comprising a steel roll which rotatably supports said material, which is disposed under said infrared radiator and said infrared thermometer, and which is heated.

10. A measuring arrangement for performing a contactless on-line measurement of the surface roughness of a material, said measuring arrangement comprising:
   (A) means for directing a spectrum of infrared rays, including a predetermined wavelength range, onto a surface of said material within an outlined measuring area in a path which is directed obliquely onto said surface;
   (B) means for receiving and measuring infrared rays reflected from said surface of said material, the intensity of said reflected infrared rays depending on the surface roughness of said material, the intensity of said reflected infrared rays being integrated over predetermined wavelengths within said predetermined wavelength range to determine a temperature of said reflected infrared rays; and
   (C) means, responsive to output values of said means (B), for determining the surface roughness of said material.

11. The measuring arrangement as claimed in claim 10, wherein said means (C) comprises means for comparing values determined by said means (B) to a set value and for generating differential signals which are transmitted to a control device for mechanically altering the surface roughness of said material.

* * * * *